March 12, 1940. A. HAAS 2,193,359
WOODWORKING SHAPER AND THE LIKE
Filed April 7, 1937 3 Sheets-Sheet 1
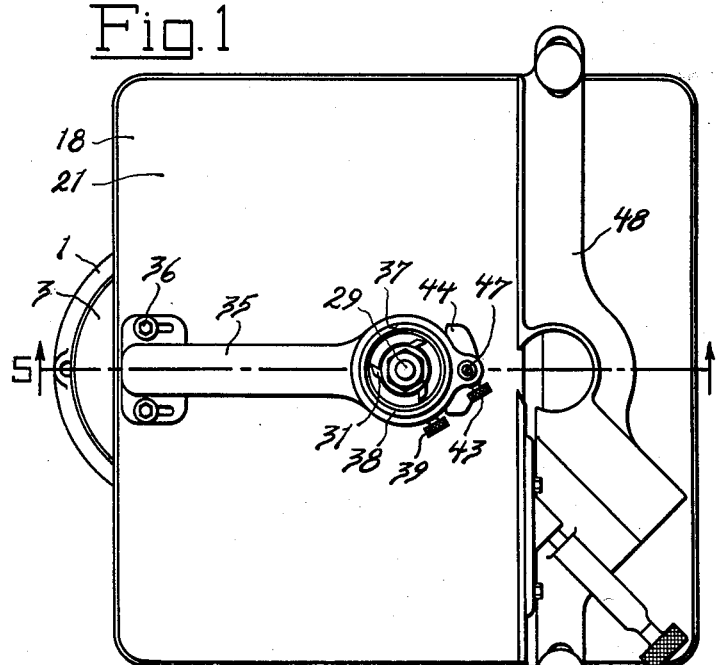
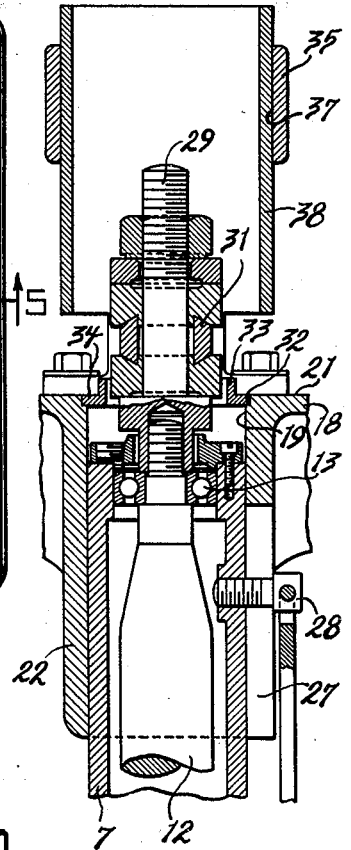
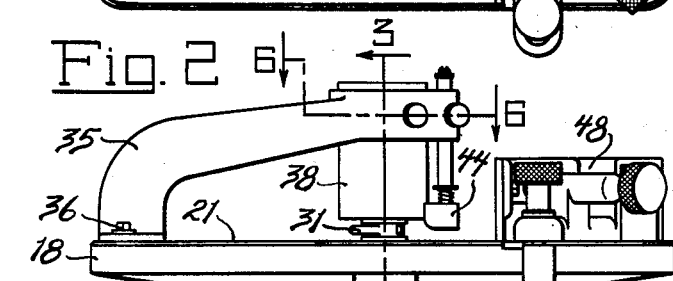
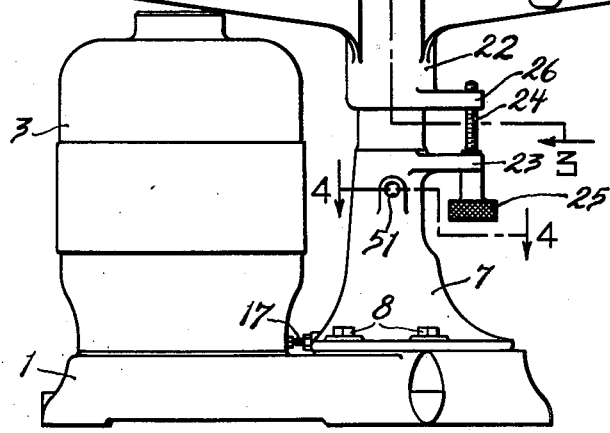
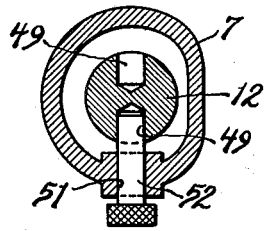
INVENTOR
ALVIN HAAS
BY *Robert F. Michler*
ATTY.

March 12, 1940.  A. HAAS  2,193,359
WOODWORKING SHAPER AND THE LIKE
Filed April 7, 1937   3 Sheets-Sheet 2
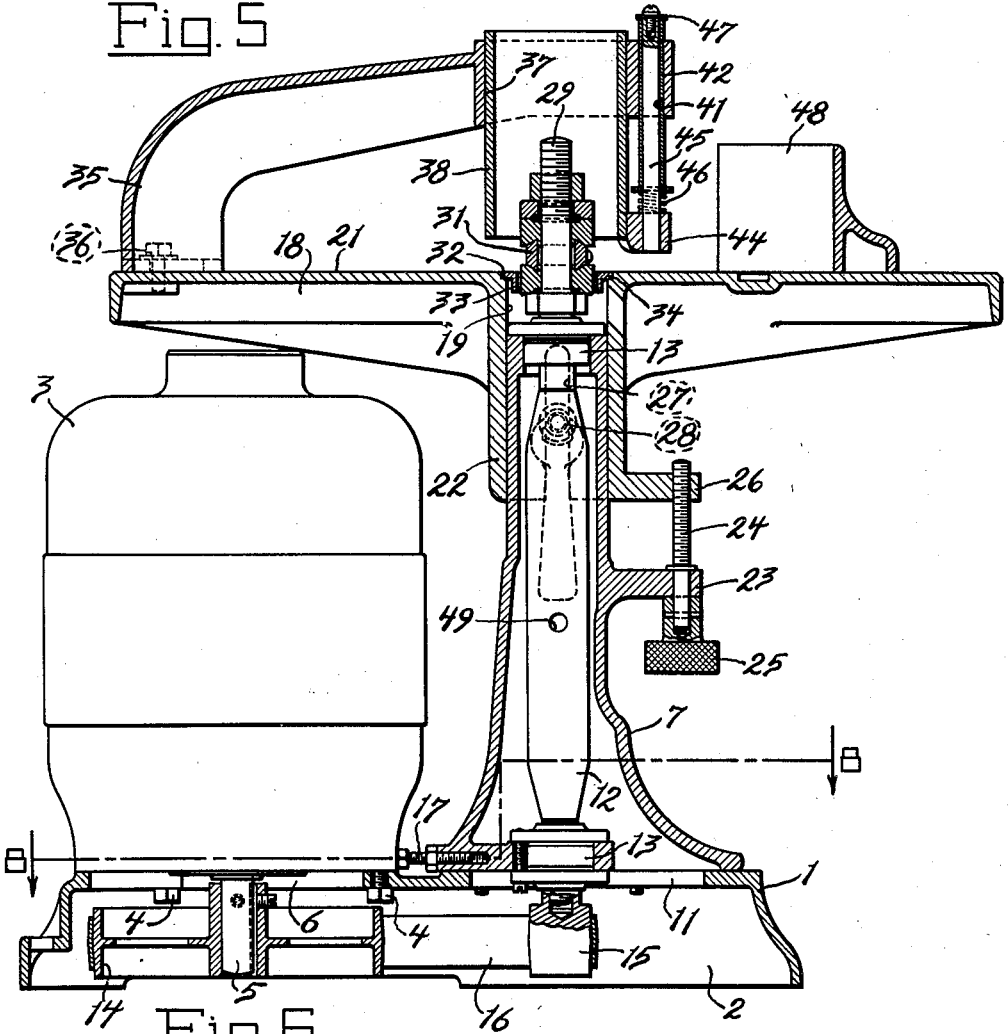
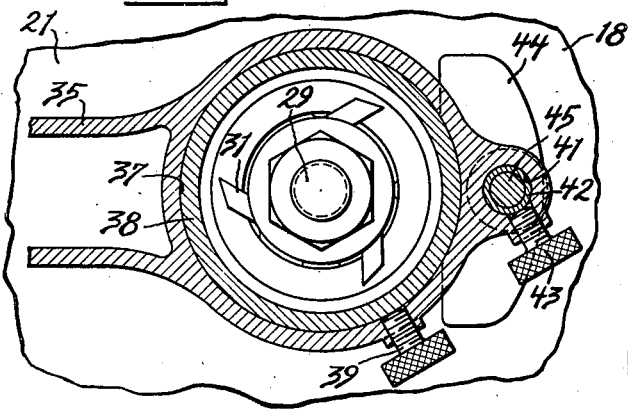
INVENTOR
ALVIN HAAS
BY Robert F. Miehle, Jr.
ATTY.

March 12, 1940.  A. HAAS  2,193,359
WOODWORKING SHAPER AND THE LIKE
Filed April 7, 1937   3 Sheets-Sheet 3

INVENTOR
ALVIN HAAS
BY *Robert F. Miehle, Jr.*
ATTY.

Patented Mar. 12, 1940

2,193,359

UNITED STATES PATENT OFFICE 2,193,359

WOODWORKING SHAPER AND THE LIKE

Alvin Haas, Peru, Ill.

Application April 7, 1937, Serial No. 135,510

1 Claim. (Cl. 144—134)

My invention relates particularly to woodworking shapers although not limited to this use alone.

One feature of my invention resides in the provision of a novel and desirable frame and belt and pulley transmission structure which is particularly adapted for woodworking shapers, the invention contemplating a desirable arrangement of the frame structure with the transmission, enclosure of the transmission, and adjustment for proper belt tension.

Other features of my invention relate to a novel and desirable adjustment of the work supporting tables of such machines, and guide and guard devices thereof, all with a view toward convenience and safety in operation.

With these features in view my invention consists in certain features of novelty in the construction, combination, and arrangement of parts by which the said features and certain other features, hereinafter appearing, are effected all as fully described with reference to the accompanying drawing and more particularly pointed out in the appended claim.

In the said drawings—

Figure 1 is a top plan view of a woodworking shaper embodying my invention;

Figure 2 is a side elevation of the same;

Figure 3 is an enlarged partial section on the line 3—3 of Figure 2;

Figure 4 is an enlarged section on the line 4—4 of Figure 2;

Figure 5 is an enlarged partial section on the line 5—5 of Figure 1;

Figure 6 is an enlarged partial section on the line 6—6 of Figure 2;

Figure 7:
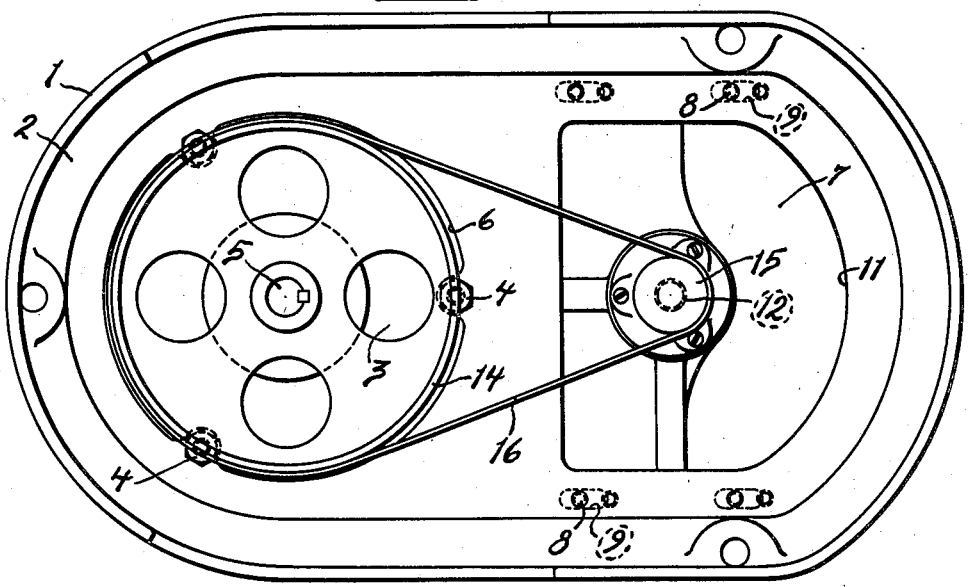
Figure 7 is an enlarged partial bottom plan view of the machine.
Figure 8:
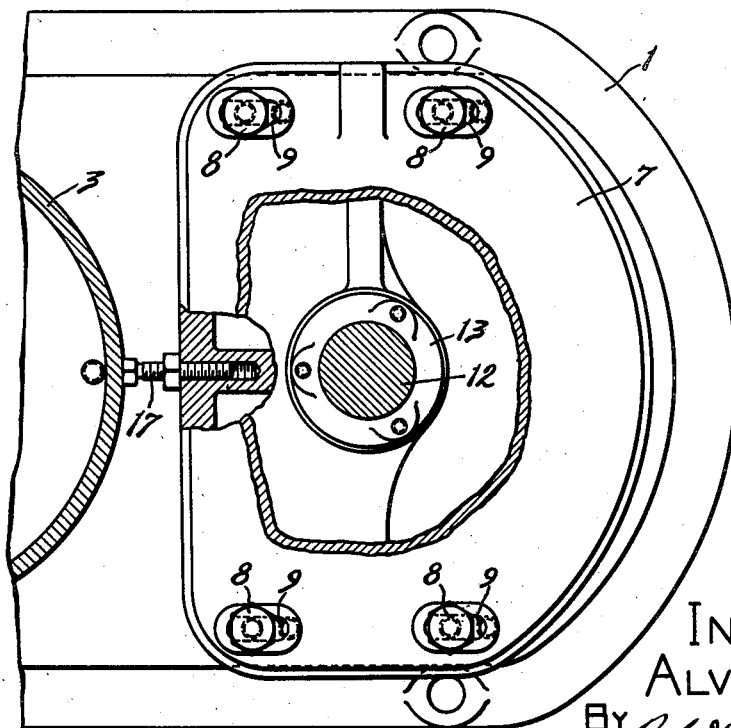
Figure 8 is an enlarged partial sectional view on the line 8—8 of Figure 5.

Referring to the drawings, 1 designates a hollow flat base forming an enclosure 2, which base is horizontally disposed and open at the bottom. See Figures 2, 5 and 7. An electric motor 3 is secured on top of the base by means of screws 4, and, projecting upwardly from the base, is disposed on a vertical axis and has its vertical shaft 5 projecting downwardly into the enclosure 2 of the base through an opening 6 in the upper wall of the base. The opening 6 is closed by the body of the motor.

A vertically disposed hollow generally tubular frame element or standard 7 is secured on top of the base at one side of the motor by means of headed screws 8 passing through parallel elongated apertures 9 through the enlarged base of this frame element and screwthreaded into the top of the base 1, thus affording adjustable positioning of this frame element with reference to the base in a path toward and away from the motor 3 for a purpose hereinafter appearing.

The frame element or standard 7 extends upwardly from the base at one side of the motor 3, and the enclosure thereof communicates with the enclosure 2 of the base 1 through an opening 11 in the upper wall of the base, which opening underlies the aforesaid frame element.

A tool carrying shaft 12 extends vertically within the frame element or standard 7 in parallelism with the motor shaft 5 and is supported for rotation therein by means of vertically spaced bearings, generally designated at 13.

Secured on the lower end of the motor shaft 5 within the enclosure 2 of the base 1, is a belt pulley 14, and a smaller belt pulley 15 is secured on the lower end of the shaft 12 within the enclosure 2. A transmission belt 16, within the enclosure 2, is trained over the pulleys 14 and 15, so that the motor shaft 5 drives the shaft 12, it being observed that the association of the belt and pulley transmission with the base and below the motor, and, as shown, the enclosure of this transmission within the base affords a desirable arrangement both from the standpoint of utility and that of appearance.

Horizontal adjustment of the frame element or standard 7 on the base, as aforesaid, serves for conveniently adjusting the tension of the belt, and to facilitate such tensioning, a set screw 17 is screwthreaded horizontally into the base of the frame element or standard 7 and abuts the body of the motor 3 to separate the frame element from the motor against the belt tension.

A work table 18 is provided with a central bore 19 therethrough disposed normal to the usual upper or work supporting surface 21 thereof, and is provided with a downwardly projecting bored hub formation 22 extending this bore. See Figures 2, 3 and 5.

The work table 18 is slidably engaged by means of the bore 19 upon the upper portion of the frame element or standard 7 for vertical adjustment of the work table. The frame element or standard 7 is provided with a radial lug 23, and a vertically disposed screw 24, having a manipulating knob 25, is rotatably mounted on the lug 23 and is screwthreaded through a radial lug 26 on the hub formation 22, to the end that the work table may be conveniently adjusted vertically on the frame element 7.

The hub formation 22 is provided with a longitudinal slot 27, and a headed set screw 28 extends through this slot and is screwthreaded into the frame element 7, to the end that the work table may be clamped in vertically adjusted position on the frame element, the engagement of the set screw 28 in the slot 27 serving to prevent rotation of the work table.

The work table is thus conveniently adjustable vertically.

The upper end of the shaft 12 is extended upwardly by an extension shaft 29 which extends above the work surface 21 of the work table and carries a suitable rotary cutter tool assembly, generally designated at 31, for operation on work passed over the work surface 21 in a usual manner as the shafts 12 and 29 are rotated by the motor 3.

The bore 19 of the work table 18 is counterbored at the work supporting surface 21 thereof, as designated at 32, and a circumferentially flanged annular member of right angle radial section, comprising a cylindrical portion 33 and a circumferential flange portion 34 at one end thereof, is reversibly mountable in the counterbore 32.

When the aforesaid annular member is mounted in the counterbore 32 with the cylindrical portion 33 projecting upwardly, as shown in Figure 3, this cylindrical portion projects above the work surface 21 and is engageable with work on the work surface to limit movement of the work toward the cutter tool axis. When the aforesaid annular member is mounted in the counterbore 32 with the cylindrical portion 33 projecting downwardly, as shown in Figure 5, this cylindrical portion is not effective as above described, the annular member serving in either case to exclude chips from entering the bore 19.

An arm 35 is secured, as designated at 36, on the work table 18 adjacent one edge thereof and extends horizontally spaced above the work supporting surface 21. The extending end of the arm 35 is provided with a vertical bore 37 arranged concentrically with the shafts 12 and 29. A cylindrical guard member 38 is slidably engaged for vertical adjustment in the bore 37 is secured in vertical adjustment on the arm 35 by means of a set screw 39 screwthreaded in the arm 35 and radially engaging the guard member 38 to adjustably position the same in the bore 37.

The arm 35 is provided with a second vertical bore 41 arranged adjacent and in parallelism with the bore 37 and the axis of the shafts 12 and 29. A tubular member 42 is slidably engaged in the bore 41, and a set screw 43, screwthreaded in the arm 35, radially engages the tubular member 42 to adjustably position the same in the bore 41.

A work hold down member 44 is provided with a shaft 45 which is slidably engaged in the tubular member 42. A coiled compression spring 46 encircles the shaft 45 below the tubular member 42 and is operative between this tubular member and the hold down member to yieldably urge the hold down member downwardly toward the work surface 21 to horizontally position work thereon. A stop, indicated at 47, is mounted on the upper end of the shaft 45 and is operative between the tubular member 42 and the hold down member 44 to limit downward movement of the hold down member toward the work surface 21 in opposition to the spring 46.

Both the guard member 38 and the hold down member 44 are thus conveniently adjustable normal to the work surface 21 and longitudinally of the tool carrying shaft to meet various conditions, the spring pressed range of the hold down device being constant in all adjustments thereof.

The work table 18 is provided with a suitable adjustable work guide, generally indicated at 48, which does not require detailed description for present purposes.

In order to lock the shaft 12 against rotation for the change of cutters, the shaft 12 is provided with radial bores 49 which are registerable with a bore 51 in the wall of the frame member 7, to the end of engaging a stud 52 in the bore 51 and one of the bores 49 and thus temporarily locking the shaft 12, as shown in Figure 4.

Having thus described my invention, I do not wish to be limited to the precise details described, as changes may be readily made without departing from the spirit of my invention, but having thus described my invention, I claim as new and desire to secure by Letters Patent the following:

In a device of the character described, the combination of a flat horizontally disposed base forming an enclosure, a hollow frame element supported thereby and extending upwardly therefrom, a work table spaced above said base and supported on said frame element, an electric motor supported on said base and extending axially upward therefrom, a revoluble driven shaft carried with said frame element and extending upwardly therein from said base, a belt and pulley transmission within the enclosure of said base and operatively connecting the shaft of said motor and said driven shaft, and means for effecting horizontal adjustment of said frame element on said base relative to said motor.

ALVIN HAAS.